(12) United States Patent
Althaus et al.

(10) Patent No.: US 7,464,551 B2
(45) Date of Patent: Dec. 16, 2008

(54) METHOD FOR OPERATION OF A POWER GENERATION PLANT

(75) Inventors: Rolf Althaus, Flawil (CH); Martin Koller, Baden (CN); Karl Wiederhold, Bruchsal (CH)

(73) Assignee: Alstom Technology Ltd., Baden (CH)

( * ) Notice: Subject to any disclaimer, the term of this patent is extended or adjusted under 35 U.S.C. 154(b) by 779 days.

(21) Appl. No.: 11/028,444

(22) Filed: Jan. 4, 2005

(65) Prior Publication Data

US 2005/0172630 A1  Aug. 11, 2005

Related U.S. Application Data

(63) Continuation of application No. PCT/CH03/00431, filed on Jun. 30, 2003.

(30) Foreign Application Priority Data

Jul. 4, 2002  (CH) ..................... 1177/02

(51) Int. Cl.
*F01K 13/02* (2006.01)
(52) U.S. Cl. .............. 60/646; 60/657; 60/659; 60/660
(58) Field of Classification Search ........... 60/646, 60/657, 659, 660
See application file for complete search history.

(56) References Cited

U.S. PATENT DOCUMENTS

| | | | | |
|---|---|---|---|---|
| 4,237,692 | A * | 12/1980 | Ahrens et al. ......... | 60/659 |
| 4,287,465 | A | 9/1981 | Godard et al. | |
| 4,312,179 | A | 1/1982 | Zaugg | |

(Continued)

FOREIGN PATENT DOCUMENTS

CH    329 159    4/1958

(Continued)

OTHER PUBLICATIONS

Search Report for Swiss Appl. No. CH 1177/02 (Oct. 10, 2002).

(Continued)

*Primary Examiner*—Hoang M Nguyen
(74) *Attorney, Agent, or Firm*—Cermak Kenealy & Vaidya LLP; Adam J. Cermak

(57) ABSTRACT

A storage power station (S), for example an air storage plant, that includes a compressor unit (V), a turbine unit (T) and a storage volume (100) can be operated using a specific method of operation, which allows as fast a reaction as possible to changes in the load demands. Rapid changes in the load demands can be satisfied by controlling the power consumption of the compressor unit (V), which results in a variable net power output, with the power output from the turbine unit (T) remaining constant. The power of the compressor unit can be controlled approximately one order of magnitude more quickly than the power generation machine can be controlled. In the extreme, the compressor unit can simply be shut down, thus resulting in its drive power becoming available to an electricity grid within seconds. During this process, the turbine unit can continue to operate normally, and can slowly follow the power demand, thus reducing the load on the turbine. A storage power station can thus be ideally suitable for frequency support and for covering rapid load ramps in an electricity grid.

18 Claims, 4 Drawing Sheets

U.S. PATENT DOCUMENTS

| | | | |
|---|---|---|---|
| 4,324,987 A | 4/1982 | Sullivan, II et al. | |
| 4,353,214 A | 10/1982 | Gardner | |
| 4,686,822 A | 8/1987 | Frutschi | |
| 5,685,155 A * | 11/1997 | Brown et al. | 60/698 |
| 5,778,675 A * | 7/1998 | Nakhamkin | 60/652 |
| 5,845,479 A * | 12/1998 | Nakhamkin et al. | 60/777 |
| 6,026,349 A | 2/2000 | Heneman | |
| 6,134,124 A | 10/2000 | Jungreis et al. | |
| 6,153,943 A | 11/2000 | Mistr | |
| 6,184,593 B1 | 2/2001 | Jungreis | |
| 6,670,721 B2 | 12/2003 | Lof et al. | |
| 6,900,556 B2 | 5/2005 | Provanzana et al. | |
| 7,002,260 B2 | 2/2006 | Stahlkopf | |
| 7,086,231 B2 * | 8/2006 | Pinkerton | 60/650 |
| 2006/0007613 A1 | 1/2006 | Althaus et al. | |

FOREIGN PATENT DOCUMENTS

| | | |
|---|---|---|
| DE | 22 63 051 | 7/1974 |
| DE | 2263051 | 7/1974 |
| DE | 2756490 | 7/1979 |
| DE | 28 22 575 | 11/1979 |
| GB | 2020367 | 11/1979 |
| WO | 2004/005685 | 1/2004 |

OTHER PUBLICATIONS

International Search Report for PCT Appl. No. PCT/CH03/00431 (Sep. 4, 2003).

Masayuki, S. "Working Power Peak Cut Device," Patent Abstracts of Japan (Mar. 20, 1989), Publication No. 01074027.

* cited by examiner

METHOD FOR OPERATION OF A POWER GENERATION PLANT

This application is a Continuation of, and claims priority under 35 U.S.C. § 120 to, International Application number PCT/CH03/00431, filed 30 Jun. 2003, and claims priority under 35 U.S.C. § 119 to Swiss Application number 2002 1177/02, filed on 04 Jul. 2002, the entireties of which are incorporated by reference herein.

BACKGROUND OF THE INVENTION

1. Field of the Invention

The present invention relates to a method for operation of a power generation plant.

2. Description of Related Art

An air storage turbine has been disclosed in DE 28 22 575. At times when the power consumption is low, for example at night and at weekends, a compressor acting as a power consuming machine uses electricity that is generated by basic load power stations to pump air into a storage volume, for example an underground cavern in a salt mine. The cavern is charged, for example, to 100 bar. At times when the electricity demand is high or if another power station fails, the stored air is used to drive an air turbine or a combined air/gas turbine, which generates electrical power via a generator. This significantly lengthens the operating life of basic load power stations and, in liberalized electricity markets, the peak power that can be generated in this way allows a considerable financial saving to be achieved. Furthermore, in liberalized electricity markets, the process of covering transient power demands, such as those which occur when a major load is switched on but especially when a major power station block fails, is highly lucrative. Even the pure provision of appropriate capacities can save a very large amount of money. When power generating plants fail, the capability for frequency support is in demand. During the first fractions of a second after the failure of an electricity supply, the grid frequency can be kept within the permissible tolerance without any further problems in a large grid by virtue of the rotating masses of the remaining power stations. However, after this, power reserves must be available immediately in order to prevent the frequency from decreasing, and thus prevent failure of the entire grid. Steam power stations which are operated slightly throttled back can provide power amounting to the order of magnitude of around 5% of their maximum power very quickly; however, they require several tens of minutes for power increases beyond this, for example up to 30% of their maximum power. When a major load is connected to the grid, load ramps are demanded from the power stations, in which the provision of a considerable amount of additional power is demanded in a time period in the region of seconds or up to ten minutes. Gas turbine plants and combination plants allow such increases to be coped with within minutes. An air turbine or combined air/gas turbine in a storage power station of the cited type has a comparable reaction. It is also known from operating experience that rapid load changes such as these cause severe temperature gradients and, associated with them, damaging thermal alternating loads and mechanical stresses particularly in the hot gas path (which is already thermally highly loaded in any case) of gas turbine groups or in the steam generators for steam and combination power stations. Geodetic hydroelectric power stations are admittedly able to mobilize significant power reserves within seconds; however, their availability is, of course, restricted.

SUMMARY OF THE INVENTION

According to an aspect of the hereinafter described invention a method of the type initially mentioned can avoid the disadvantages of the related art. According to a more specific aspect, the method can be more particular on specifying a capability to react quickly to transient load demands on a power generation plant, both in terms of frequency response and, very particularly, with respect to rapid load ramps.

This aspect, among various other aspects, can be achieved by the method specified in claim 1.

Based on a power generation plant which comprises a power consuming machine and a power generation machine, one feature of the presented method is to react to transients in the power demand by means of appropriate adaptation of the power which is consumed in the power consuming machine. In practice, it has been found that, by controlling or even shutting down the power consuming machine, it is possible to achieve at least around one order of magnitude greater load gradients than by means of a control action on the power generation machine. In one method variant, the power which is output by the power generation machine is, in a first step, kept constant. This furthermore has the advantage that the power transient does not per se act on a thermally highly loaded power generating structure but on a considerably less highly loaded power-consuming structure. Air storage plants are particularly suitable for this purpose since by virtue of their nature they have, for example, separately arranged turbines and compressors as well as a storage in which compressed fluid is temporarily stored for driving the power generation machine and is available even when the power consuming machine is at rest or is operating at a reduced power level. The power generation plant is in this case in a specific initial operating state, in which the power consuming machine, or possibly and preferably also two or more power consuming machines, are feeding a specific mass flow of an energy storage fluid, for example compressed air, to the storage volume for the power generation plant while, possibly at the same time, a second mass flow of the energy storage fluid is expanded via the power generation machine. Heat can be advantageously supplied to the energy storage fluid before and/or during the expansion process. In this case, the power consuming machine can consume power in particular via an electric drive motor, and the power generation machine can emit power via an electrical generator. The net power output of the power generation plant is defined as the difference between the power emitted by the generator and the power consumed by the motor. In an exemplary initial operating state, the power generation plant is operated in a steady state in such a way that the mass flow which is fed into the storage volume from the power consuming machine corresponds to the mass flow flowing through the power generation machine. This corresponds to a known gas turbine process in which, however, the turbine and compressor are not rigidly coupled. Depending on the grid load and the electricity price to be achieved or to be paid for at any given time, the initial operating state may, however, also be a discharge mode in which the mass flowing out of the storage is greater than the mass flow that is fed by the power consuming machine, or a charging mode, in which the storage is charged. In this case, the power generation machine may in fact also be stationary in the initial operating state, which corresponds to a considerably negative net power output.

An initial operating state in which the maximum capability to suddenly increase the power for frequency support is available is an operating state in which all the power consuming machines in the power generation plant are being operated at maximum power. The entire power consumption of the power consuming machines—as will also be described in the following text quite possibly a multiple of the rating during equilibrium operation of the power generation plant—can in principle be made available to the grid simply by opening a switch. In a second step, although considerably more slowly, the power of the power generation machines can be increased, provided that they are not being operated at maximum power in the initial operating state. To this extent, it appears to be desirable to make use of an initial operating state in which the power consuming machines are running with their full power consumption, while the power generation machines are stationary or are running on no load. Admittedly, when seen in absolute terms, an initial operating state such as this results in the greatest potential to increase the power. However, the power component to be produced by the power generation machines is available only with a delay since power generation machines which are operated on no load—or to be more precise their generators—must first of all be synchronized to the grid. In the interest of the maximum power dynamic response, it has therefore been found to be advantageous to keep the power generation machines already synchronized to the grid with a small amount of power being emitted to the grid. In one very particularly preferred operating method, all of the power consuming machines are thus operated at at least 80% of their maximum power consumption. At the same time, all of the power generation machines are synchronized to the grid and are operated with as low a power output as possible, preferably of less than 10% or less than 20% of their maximum power output; however, operational reasons may also demand a higher minimum power. Starting from this initial operating state, it is possible when a rapid power demand occurs to shut down the power consuming machines by opening switches and at the same time to pass a command to increase the power to the power generation machines. The power which was previously consumed by the power consuming machines is then instantaneously available to the grid, and the power from the power generation machines is made available with a delay time that is intrinsic to the system and, in particular, with a power gradient that has an upper limit, but without having to previously wait for synchronization. The power dynamic response is thus maximized.

A feature of the invention is that the power consuming machine is consuming power in the initial operating state. This is because the presented method may be regarded as being to use the power consuming machine which is feeding a store to create a secondary power demand, which can be shut down as required, in addition to the actual power consumers in an electricity grid, in the form of a bias, and to increase the net power output from a power generation plant virtually instantaneously if necessary by reducing or shutting down this secondary power consumption. The power output from the power generation machine may in this case be kept constant, at least in a first step.

The extremely wide load control range of a storage plant which is operated according to the invention is significant. This is because, based on the rule of thumb that, in the case of a gas turbine, around two thirds of the gross turbine power is consumed in the compressor, it can easily be seen that, on the basis of a plant which is being operated in the steady state, that is to say at equilibrium, 200% of the instantaneous net power output is instantly available just by shutting down the compressors! The entire load control range of the plant—assuming that the compressor design is based on steady-state operation in equilibrium with the power generation machine as 100%—can then roughly be estimated to have a net power output from −200% to +300% of the rating that is available when operating in equilibrium. This range can also be widened even further by designing the compressor to be correspondingly larger, in which case a turbocompressor, for example, can be operated very efficiently on partial load by rotation speed regulation—in fact, the compressor need not be operated in synchronism with the grid.

In one embodiment of the invention, the power consumption of the power consuming machine is controlled such that, when changes occur in the power demand in an electricity grid in which the power generation plant is operated, the sum of the power consumption of the power consuming machine and the power demand of the grid remains constant. The constancy of this maximum power output is preferably regulated to less than 5% of the maximum power output of the power generation machine.

It is self-evident, for example when a very large block is disconnected from the grid or a large load is connected to it, that it is also necessary to take account of situations in which the additional power demand can no longer be satisfied purely by controlling the power of the power consuming machines; in situations such as these, the power consuming machines are completely disconnected from the grid, and the power generation machine is operated in conjunction with other power stations that are integrated in the grid, in a manner that is known per se, with the maximum power gradient. Assuming that the storage volume has been charged sufficiently, it is possible to react very quickly and flexibly even in this situation. The greatest flexibility and the fastest reaction can in general be achieved when a storage power station comprises two or more compressors which act on a storage volume and can be controlled individually, as well as two or more individually controllable turbines which are fed from this storage volume. One embodiment of a storage power station comprises four compressor systems each having two turbocompressors and intercoolers whose rotation speeds are controlled, as well as two turbine sets, which each act on one generator; the storage power station is operated with storage pressures in the region of 30 bar, and preferably at least 50 bar up to 100 bar.

Thus, when the power demand on the power generation plant is increased, the power consumption of the power consuming machine is reduced in a first step, while the power output of the power generation machine remains constant, in order to increase the net power output and at the same time to satisfy the power demand at that time. In a second step, the power output of the power generation machine is then increased with the net power output being kept the same as the power demand at that time. In this case, the power demand on the power generation machine and the power reduction for the power consuming machine can take place at the same time without any problems, since the power increase occurs with a slight delay in any case, owing to factors that are intrinsic to the system.

When the power demand on the power generation plant is reduced, the power consumption of the power consuming machine is increased, in a first step, while the power output of the power generation machine remains constant, in order to reduce the net power output and at the same time to satisfy the power demand at that time. In a second step, the power output of the power generation machine is then reduced, with the net power output being kept equal to the power demand at that time.

For long-term operation of the plant, this results in the following possible scenario: In an initial step, the storage volume of the power generation plant is charged in the storage mode, for example at night. In the process, the storage volume is not filled to the maximum level but is charged only until it is approximately half full—in this case, values of between 25% and 75% of the pressure range are very highly acceptable. These numerical figures should be understood as meaning that the pressure range is defined as a minimum permissible storage pressure for operation of the power generation plant which is defined as 0%, and a maximum permissible storage pressure, which is defined as 100% of the pressure range. In this case, the store filling is proportional to the pressure. The mean store filling setting that is chosen ensures in the event of corresponding power demands a reaction capability with an increased power consumption in the direction of storage operation and with an increased power output in the direction of discharge operation. During "neutral" operation, the power generation plant is operated in equilibrium state, as described above, such that the mass flow flowing into the storage volume is equal to the mass flow flowing out via the power generation machine. The power output is between 0% and 100%, preferably 50% to 100%, of the net rating defined above. The plant has the capability to provide power immediately by power control or shutting down power consuming machines. At peak load times, in which high prices are paid for the electricity that is supplied, the plant is operated in the discharge mode, with reduced power consuming machine power and with high or full power generation machine power. At times when the electricity demand is low and the electricity price is correspondingly low, the plant can be changed to the storage mode, in which the power generation machines are operated at a very low power level or are shut down, and the power consuming machines supply storage fluid to the storage volume. To this extent, this corresponds to the operation of a storage power station, for example an air storage power station, that is known per se. However, according to the invention, the storage volume is not completely charged, but is charged only to a maximum of 75%. This allows the following method of operation: At times in which the grid operator pays a high price to provide the capability to react to the grid demands quickly, the power generation plant will be operated with a high power consumption, for example of more than 80%, of the power consuming machines even when the electricity price is comparatively high. The power generation machines are synchronized to the grid at a minimum permissible power level, preferably of less than 20% of their maximum power, or even at their minimum power level. For operational reasons, the minimum permissible power level may also be higher, however; for example, the operating license for the plant may forbid relatively long-term operation at such low load levels, for various reasons. This is the situation on the one hand when the power generation plant is provided with additional firing in the power generation machine, as in the case of a combined air/gas turbine. On the one hand, the power output of the power generation machine should sensibly be chosen such that the firing is already in operation. This once again allows the objective to be derived that the firing power should be chosen such that, for example, the combustion is sufficient in order to ensure that approved CO and UHC emissions are not exceeded. This frequently results in an operationally dependent relative minimum power level which is above the cited 20%. In the described mode, incomplete charging of the storage volume is made use of, since the plant is in fact operated in the storage mode and more mass flows into the store than flows out of it. For this reason, the store is thus preferably not 100% filled. As stated above, this initial operating state allows the greatest possible power dynamic range. On the basis of the numerical figures stated above, around 200% of the plant rating can be provided in seconds by shutting down or controlled deceleration of the power consuming machines, and another roughly 300% can be provided within minutes by loading the power generation machine. The choice of this form of operation in a readiness mode is primarily a financial question.

As described, the method of operation of a storage plant can produce a major effect on the grid by the use of an initial load and by feeding in power, such that it is possibly worth while when, actually for the purpose of transient operations, control of the power demand is handed over from the plant operator to the grid operator.

Still other features, and attendant advantages of the invention will become apparent to those skilled in the art from a reading of the following detailed description of embodiments constructed in accordance therewith, taken in conjunction with the accompanying drawings.

BRIEF DESCRIPTION OF THE DRAWINGS

The invention will be explained in more detail in the following text with reference to exemplary embodiments which are illustrated in the drawing, in which like reference numbers designate like elements or structures, and.

Figure 1:
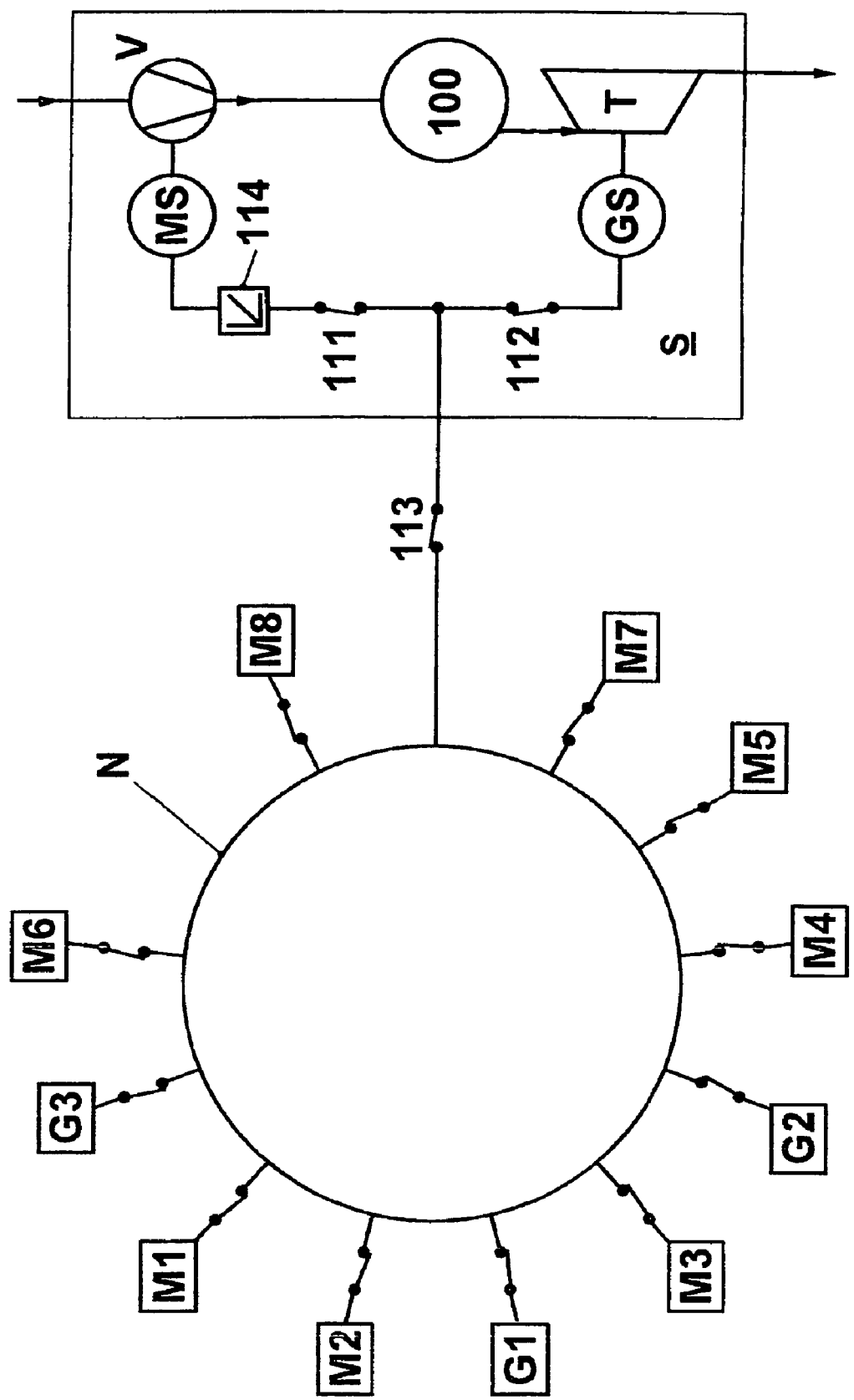
FIG. 1 is a schematic view of an electricity grid with a storage power station which can be operated according to the principles of the invention.

In this case, the illustrated exemplary embodiments represent only a small instructive detail of the invention as characterized in the claims.

DETAILED DESCRIPTION OF PREFERRED EMBODIMENTS

Referring to the drawing figures, like reference numerals designate identical or corresponding elements throughout the several figures.

FIG. 1 shows a schematic view of an electricity grid N. Loads M1 to M8 and three power stations or their generators G1 to G3, as well as an air storage power station S, are connected to the electricity grid via grid switches. An air storage power station such as this has been disclosed, for example, in DE 28 22 575, which disclosure is hereby incorporated by reference and represents an integral component of the present invention. The air storage power station S can include at least one compressor V for filling a storage volume 100 with an energy storage fluid, as well as a turbine T which can be operated with the fluid from the storage volume 100. The turbine T drives a generator GS which generates electrical power which can be fed into the electricity grid via the switch 112. The compressor V is driven by a motor MS which consumes a controllable amount of electrical power via the switch 111 and the regulator 114. The difference between the power output of the generator GS and the power consumption of the motor MS is fed into the grid N via the switch 113, as the net power output from the storage power station S. If the power consumption of the compressor V or of its drive motor MS becomes greater than the power that is generated in the generator GS, the storage power station S consumes power from the grid, via the switch 113. In a first operation state, all the power loads M1 to M8 and all the generators G1 to G3 as well as the storage power station S are connected to the grid. The power consumption of all of the loads M1 to M8 as well as that of the drive motor MS and the power output of all the power stations G1 to G3 as well as that of the generator GS are balanced out at a set grid frequency. If now, for whatever reasons, one of the power stations G1 to G3 falls off the grid by opening the grid switch, the power balance within the grid is actually no longer balanced, and the grid frequency reacts to this by dropping. The power stations that are still connected to the grid normally react to this and increase the power as quickly as possible in order to support the frequency. As described initially, power stations have widely different capabilities for rapid reaction. Furthermore, rapid load changes such as these in power stations result in structural loads on expensive power station components. In addition, the appropriate power reserves must be kept available, which means that expensive investment is not completely utilized and power stations do not run at their best operating point during normal operation. Overall, these factors mean that the maintenance and generation of power for frequency support and for coping with fast load ramps is very expensive. From the technical point of view, it would, of course, in fact be desirable to first of all disconnect appropriate power loads from the grid in the event of failure of a power station although, for obvious reasons, it is actually not directly possible. In fact, the method can make use of the disconnection of loads from the grid, for example in the event of failing of electricity generation capacities, but this is done without affecting any of the paying loads M1 to M8. This is done by the specific operation of the storage power station S, as described in the following text. As described in the introduction, an air storage power station S as described is operated in the storage mode at low-load times, for example at night and at weekends. The switch 112 is opened and the switch 111 is closed, such that the motor MS drives the power consuming machine, the compressor V, which feeds air or some other energy storage fluid into the storage volume 100. No fluid flows out of the storage volume 100. The storage power station S then only consumes power from the grid. This power consumption makes it possible to operate basic load units such as nuclear power stations or else coal-fired steam blocks at high power even at low-load times, thus making better use of their high investments. At times when there is a medium grid load, the storage power station S is not used, and the entire power demand is covered by the power stations G1 to G3 which are operating close to their best operating point. At peak load times, the switch 112 is closed and the turbine T is driven by the energy storage fluid that is stored in the storage volume 100, and itself drives the generator GS, from which a power demand that cannot be covered by the power stations G1 to G3 is fed into the grid. The invention now makes use of the knowledge that, even at times when there is a medium or high electricity demand, the motor MS in a storage plant S can be operated as a secondary load, analogously to a "bias voltage" in the electricity grid. The storage plant S is, for example, operated such that, during normal operation, the mass flow which is fed from the compressor V into the storage volume 100 is equal to the mass flow flowing out via the turbine T. Depending on the electricity price to be achieved or to be paid for at any given time, the storage plant may in this case, of course, also be operated in the storage mode or in the discharge mode; the motor MS should apply a load to the electricity grid N even when the net power output is positive, that is to say, considered from the global point of view, the storage power station S does not represent a load. In the event of sudden changes in the power demand on the storage plant S, such as those which occur for example and to a particular extent in the event of failure of one of the power stations G1 to G3 and when a large load is connected to the grid, this secondary load can be changed considerably more efficiently and quickly than it is possible to provide additional power. If, for example, one of the power stations G1 to G3 has to be disconnected from the grid, the power consumption of the motor MS is, according to the invention, reduced by simple circuitry means which are known per se, or the switch 111 is opened entirely. This means that additional power, which was previously consumed by the motor MS, is available virtually instantaneously for the loads M1 to M8. The turbine T may in this case be operated without any problem using energy storage fluid that is provided from the storage volume 100. In a next step, for example, the power of the turbine T can be increased or it can be started up for the first time. In addition, further power stations which are acting on the electricity grid can increase their power, or additional resources can be connected to the electricity grid in order to compensate for the initial power station failure. The motor MS and hence the compressor V of the storage plant S can then be started up again successively.

Figure 2:
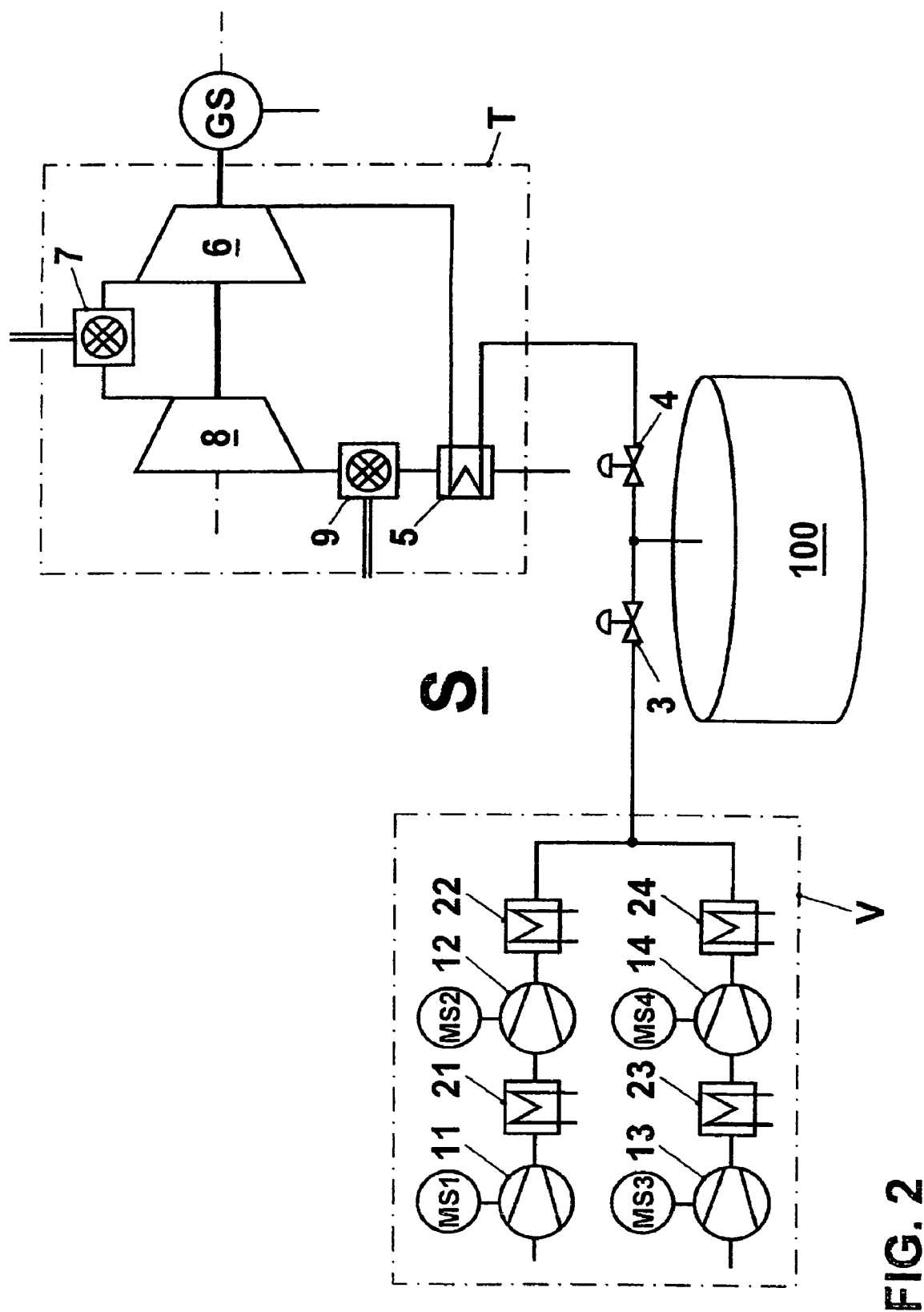
FIG. 2 is schematic view of another embodiment of a storage power station which can be operated according to the principles of the invention.

The storage power station S is illustrated highly schematically in FIG. 1. FIG. 2 shows an example of an embodiment of a storage power station S. The power consuming machine, the compressor V in this case can include two compressor runs each having two compressors and two coolers. In each compressor run, a first compressor 11 or 13 compresses air to an intermediate pressure. The air is cooled at an intermediate stage in a cooler 21 or 23 and is compressed in a second compressor 12 or 14 to a final pressure, which is typically in the range from 30 to 100 bar or 50 to 100 bar. The compressors are driven by drive motors MS1, MS2, MS3 and MS4. The compressed air flows through a throttling and shut-off member 3 into the storage volume 100. Stored air flows via a throttling and shut-off member 4 to the turbine unit T. Within this turbine unit T, the air first of all flows through an exhaust gas heat exchanger 5 where, for example, it is heated to 550° C. After this, the air is expanded in an air turbine 6 to a pressure of around 10 to 15 bar. The state of the air at the outlet from the air turbine 6 is normally comparable to the state at the compressor outlet from a gas turbine group. For this reason, the combustion chamber 7 and the turbine 8 of a gas turbine group can be arranged very particularly advantageously downstream from the air turbine. A fuel is burnt in the air in a manner known per se in the combustion chamber 7, resulting in the production of a compressed hot gas, which is expanded approximately to the environmental pressure in the turbine 8, carrying out work in the process. The expanded hot gas is optionally reheated in a further burner 9, and then flows through the exhaust gas heat exchanger 5, in which the residual heat from the exhaust gas is transferred to the supply air to the air turbine 6. The air turbine 6 and the gas turbine 8 of the turbine unit are arranged on a common shaft and drive the generator GS. In contrast to a conventional gas turbine group, the compressor and turbine are mechanically completely decoupled from one another and, owing to the intermediate storage volume in the flow path, the fluid-mechanical coupling also has a certain amount of elasticity. This makes it possible for the turbine unit T and the compressor unit V to be operated independently of one another, such that, as described above, it is possible to react in a highly flexible manner to different power demands by means of two mechanisms, namely via the power consumption of the compressor unit and the power output of the turbine unit, and to increase the net power output virtually instantaneously, in particular by shutting down power-consuming compressors. In this case, the compressor runs, which are arranged in parallel with the mass flow, can likewise be controlled independently of one another, thus further simplifying the power control for the entire storage plant S.

Figure 3:
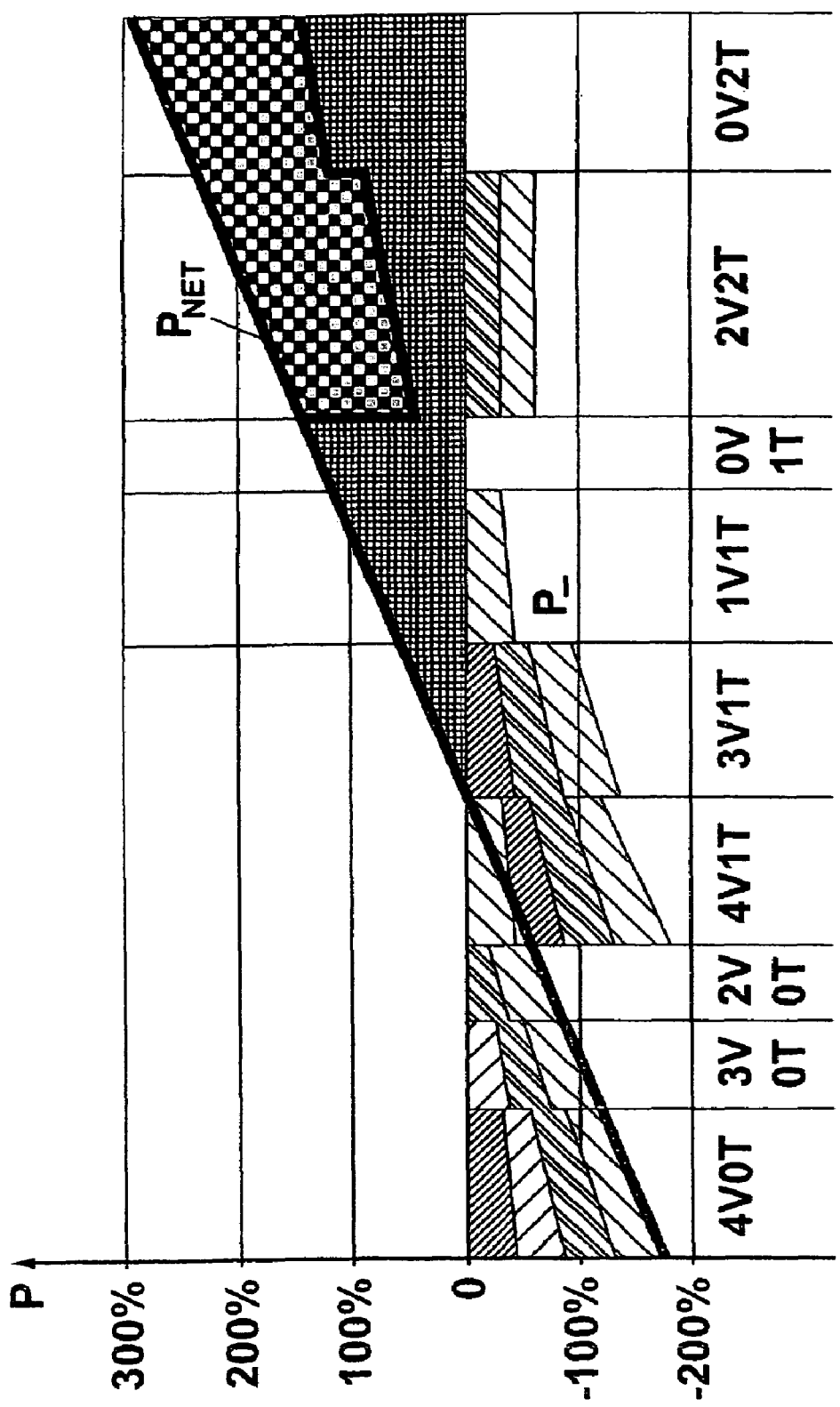
FIG. 3 shows an example of an operating concept for a storage power station showing a function of the net power output.

It is advantageous for the controllability of the storage plant for two or more independently controllable compressor runs to be arranged as power loads in parallel with the mass flow, and likewise for two or more turbine units T to be connected as power generators to a storage volume in parallel with the mass flow. FIG. 3 shows an example of an operating concept for a storage power station with four compressor runs and two turbine units. In this case, 100% power is defined as the net power output PNET which is produced when both turbine units and all four compressor runs are operating at maximum power in the equilibrium state with respect to the mass balance of the storage volume 100. The line which passes diagonally through the diagram and is annotated $P_{NET}$ represents the net power output. That portion which is below 100% and is annotated P_is the respective power consumption of the compressors. In a first operating region, which is annotated 4V0T, starting at −200% net power output, that is to say 200% net power consumption, all four compressor runs and none of the turbines are in operation. As the power consumption falls, the power consumption of all four compressor runs decreases slowly until, at one point, one of the compressor runs is taken out of operation. Three compressor runs are then operated at full power consumption and are likewise decelerated slowly; this region is annotated 3V0T. This is followed with a lower net power consumption by a region 2V0T, in which two compressor runs and no turbine units are operated. After this, a first turbine unit is started up, and all four compressor runs are operated at the same time. In the region 3V1T, three compressor runs and one turbine unit are in operation. In the region 1V1T, one compressor run and one turbine unit are in operation, and so on. At 150% net power output, the second turbine unit and two compressor runs are started up at the same time. The maximum peak load net power is achieved when both turbine units are operated at full load and no compressor run is in operation, that is to say in the region 0V2T. The net power output is then 300%. The power which is in each case shown below 0% is the respective power consumption of the compressors, and represents the power which can be provided immediately as additional net power in the manner described above. Equilibrium operation is achieved, for example, when both turbine units and all four compressor runs are running on full load, thus resulting in 100% net power output; the power consumption of the compressors is then 200%. This means that, on the basis of an embodiment of an operating method according to the invention, the storage power station is able to compensate immediately and without any delay for failure of a power station block whose power corresponds to twice its own rating! This frequency support capability and the wide control range underscore the superiority of the described operation of a storage power station.

Figure 4:
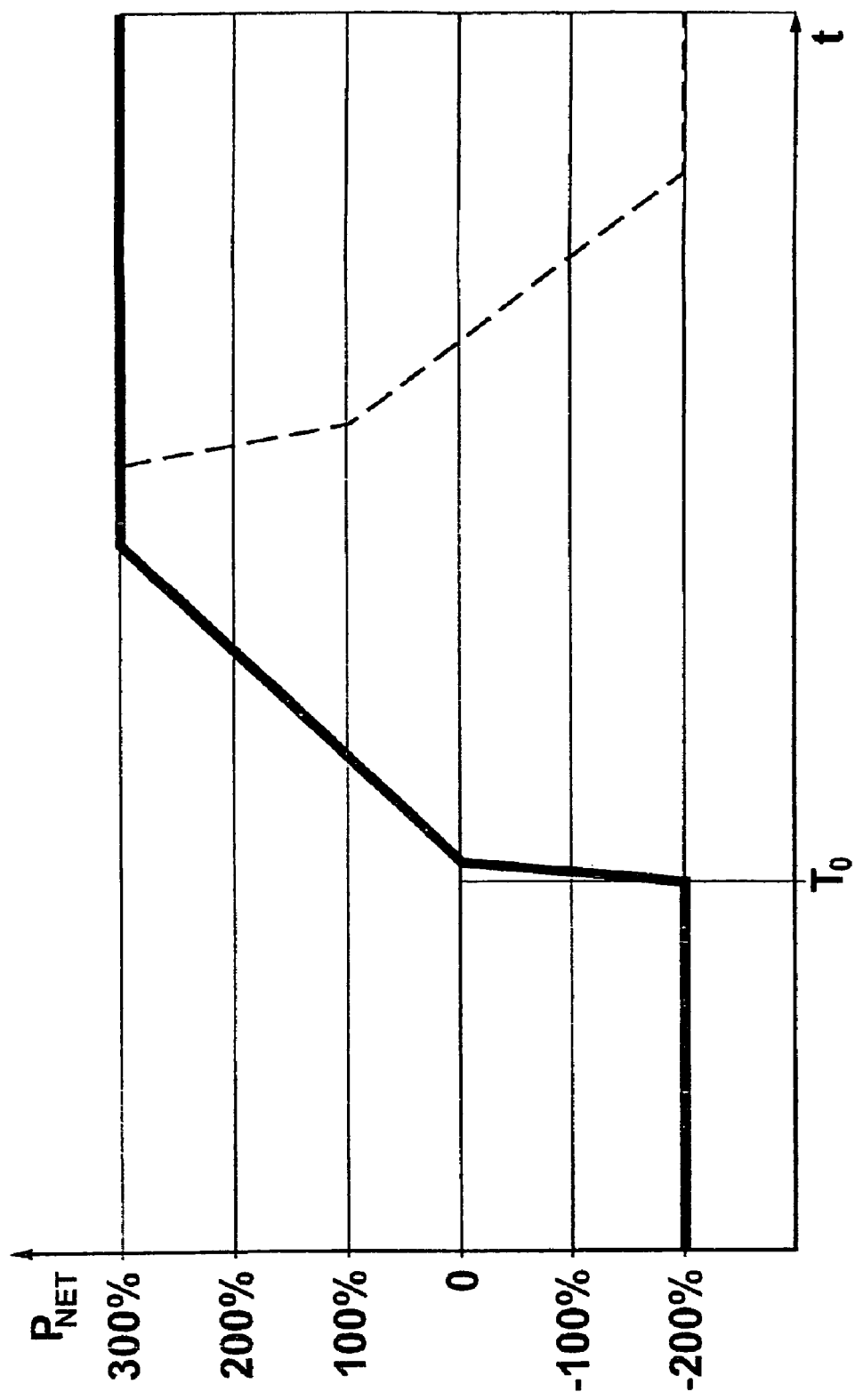
FIG. 4 shows an example of the power output dynamic range which can be achieved according to the principles of the invention.

FIG. 4 schematically illustrates the power dynamic range which can be achieved by a method conducted in accordance with the principles of the invention. The net power output $P_{NET}$ is plotted on the vertical diagram axis, with negative values indicating a power consumption, and the time is plotted on the horizontal diagram axis. This is based on an initial operating state in which, as already described a number of times, the power consuming machines are running at full power and the power generation machines are actually synchronized to the grid, or are operated at a very low power level, up to a maximum of 20% of the maximum power. Furthermore, it is quantitatively assumed that, when the power generation machines are operating in the steady state on full load, ⅔ of the entire power that is generated is required for compression of the working medium, and that the power consuming machines are designed for their maximum power at this operating point. It would, of course, also be possible to design the power consuming machines to be larger and thus to cover an even wider power range. In the initial operating state, the net power output is −200%. Power is thus being drawn from the grid. At the time $t=T_0$, the maximum amount of additional power is being demanded from the power generation plant. This power generation plant can react to the situation by shutting down the power consuming machines, as a result of which 200% power is released virtually instantaneously; the net power output is then 0%. Even when compressors that are used as power consuming machines are run down in a controlled manner, the typical power gradients that are achieved are around 120% per minute, with respect to the plant rating, as has already been defined a number of times! At the same time, the power output of the power generation machines is increased, which leads, although considerably more slowly, to a further power increase up to 300%. It must be stressed that the additional useful power in the case of a storage plant such as an air storage plant can intrinsically be produced very quickly but that, in all cases, this takes place at least one order of magnitude more slowly than is possible by reducing or shutting down the power consumption of the power consuming machines in the storage power station. Typically, it can be assumed that the power generation machine can consume power with a gradient of around 15% per minute. A dashed line is used to show the dynamic range with which the power station plant can advantageously react to a falling power demand. In this case, a falling net power output is first of all provided by controlled acceleration of the power consuming machine at, for example, 120% per minute, thus making it possible to achieve a reduction in the net power output of around 200% of the plant rating in 100 seconds. If greater load changes occur, the power output of the power generation machine is also changed. This also reveals another interesting item. A storage plant of the described type which is operated as described above makes it possible to achieve rapidly successive load cycles of up to 200% of the plant rating without needing to subject thermally highly loaded components to any alternating load. Within this order of magnitude, the power control can be carried out completely by the power consuming machines. Reference is made once again to FIG. 2, in order to estimate the alternating thermal load on them. Assuming that the storage pressure is 100 bar, that the pressure ratios of each of the series-connected compressors 11 and 12 or 13 and 14 are the same, that the compression process takes place from the environmental state at 15° C. and intermediate cooling is carried out in the coolers 21, 23 to environmental temperature, and subject to isotropic compression, maximum temperatures of little more than 300° C. are reached and, if the storage pressure is 50 bar, only around 250° C. These temperatures are, of course, considerably lower than those in the power consuming machine, for which reason alternating loads result in considerably lower loads on the structures. As mentioned a number of times above, the power range to be covered solely by compressor control can be widened further by designing the compressors to be correspondingly larger.

An additional advantage of the above described method is that the technology of air storage turbines and their use for peak load coverage are well known and proven in engineering. When designing a power station to be operated, it is also possible to use proven standard components to a major extent.

REFERENCE SYMBOLS

3 Shut-off and throttling member
4 Shut-off and throttling member
5 Heat exchanger, exhaust gas heat exchanger, recuperator
6 Air turbine
7 Combustion chamber
8 Gas turbine
9 Additional firing
11 Compressor
12 Compressor
13 Compressor
14 Compressor
21 Intercooler
22 Air cooler
23 Intercooler
24 Air cooler
100 Storage volume
111 Switch
112 Switch
113 Mains switch
114 Regulator
G1, G2, G3 Power stations
GS Generator for the power generation machine in the storage power station
M1, M2, M3, M4, M5, M6, M7, M8 Loads
M Drive motor for the power consuming machine for the storage power station
MS1, MS2, MS3, MS4 Drive motors for the power consuming machine for the storage power station
S Storage power station
T Turbine unit, power generation machine
V Compressor unit, power consuming machine
$P_{NET}$ PNET Net power output
P_ Power consumption of the power consuming machine While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A method for operating a power generation plant in an electricity grid, the power generation plant including,
    at least one storage volume for storing an energy storage fluid therein,
    at least one power generation machine for operation with energy storage fluid, the power generation machine drivingly connected to a generator and capable of supplying electric power output via the generator during operation,
    at least one power consuming machine for feeding energy storage fluid into the storage volume, the power consuming machine drivingly connected to a motor and consuming power during operation via the motor,
    the method comprising:
    simultaneously feeding energy storage fluid into said storage volume with said at least one power consuming machine and operating said at least one power generation machine with said energy storage fluid; and
    supplying a net power output ($P_{NET}$) as the difference between the power output generated by the power generation machine and the power consumed by (P_) the motor of the at least one power consuming machine, said supplying a net power output comprising
    operating the power generation plant in a first operating mode at a first grid power demand, the first operation made including operating the power generation machine with a first power output and operating the power consuming machine with a first power consumption; and
    upon a change of the power demand to a second power demand, matching the net power output of the power generation plant to the second power demand by changing the power consumption of the power consuming machine.

2. The method as recited in claim 1, further comprising:
    maintaining the power supplied by the power generation machine constant.

3. The method as recited in claim 1, further comprising:
    operating the power consuming machine to approximately compensate for load fluctuations in the grid, such that the power consumption of the power consuming machine is controlled to maintain the sum of the power consumption of the power consuming machine and the power demand from the grid to be approximately constant.

4. The method as recited in claim 3, wherein operating the power consuming machine includes regulating the constancy of the total power consumption to less than 5% of the maximum power output of the power generation machine.

5. The method as recited in claim 1, further comprising:
    decreasing the power consumption of the power consuming machine when the power demand is increased to a second power demand; and
    increasing the power output of the power generation machine, with the net power output being maintained approximately constant and equal to the second power demand.

6. The method as recited in claim 1, further comprising:
    increasing the power consumption of the power consuming machine when the power demand is reduced to a second reduced power demand; and
    reducing the power output of the power generation machine, with the net power output being maintained approximately constant and equal to the second reduced power demand.

7. The method as recited in claim 1, wherein, in the first operating mode, the mass flow of the energy storage fluid which is fed to the storage volume and the mass flow of the energy storage fluid which flows out of the storage volume are equal.

8. The method as recited in claim 1, wherein the power generation plant includes two or more power consuming machines which can be controlled independently of one another, further comprising:
    upon a rise in the power demand, successively deloading and/or shutting down individual power consuming machines, and
    upon a decrease in the power demand, successively uploading and/or starting individual power consuming machines.

9. The method as recited in claim 1, wherein the power generation plant includes two or more power generation machines which can be controlled independently of one another, further comprising:
    upon a rise in the power demand, successively uploading and/or starting individual power generation machines; and
    upon a decrease in the power demand, successively deloading and/or shutting down individual power generation machines.

10. The method as recited in claim 1, wherein the power generation plant includes a plurality of power generation machines and a plurality of power consumption machines, further comprising:

maintaining maximum power dynamic response capability by operating all the power consuming machines each at at least 80% of their maximum power consumption, and by maintaining the generators of all the power generation machines synchronized and connected to the grid, with the power generation machines each being operated at the minimum permissible power output.

11. The method as recited in claim 10, further comprising:

operating the power generation machines at less than 20% of their maximum power output.

12. The method as recited in claim 1, wherein the power demand is commanded by a grid operator utility.

13. The method as recited in claim 10, further comprising:

operating the power generation machines at less than 10% of their maximum power output.

14. The method as recited in claim 1, further comprising:

maintaining maximum power dynamic response capability by operating the power consuming machine at at least 80% of its maximum power consumption, and by maintaining the generator of the power generation machine synchronized and connected to the grid, with the power generation machine being operated at the minimum permissible power output.

15. The method as recited in claim 14, further comprising:

operating the power generation machine at less than 20% of its maximum power output.

16. The method as recited in claim 14, further comprising:

operating the power generation machine at less than 10% of its maximum power output.

17. The method as recited in claim 5, wherein decreasing occurs in a first step, and decreasing and increasing occurs in a second step.

18. The method as recited in claim 6, wherein increasing occurs in a first step, and increasing and decreasing occurs in a second step.

* * * * *